United States Patent [19]
Kobayashi et al.

[11] Patent Number: 5,144,605
[45] Date of Patent: Sep. 1, 1992

[54] OPTICAL DISK APPARATUS AND METHOD FOR CONTROLLING MOVEMENT OF LIGHT SPOT THEREOF

[75] Inventors: Seiji Kobayashi; Norio Nishida; Naoya Eguchi, all of Kanagawa; Shunji Yoshimura, Tokyo, all of Japan

[73] Assignee: Sony Corporation, Tokyo, Japan

[21] Appl. No.: 449,933

[22] PCT Filed: Apr. 18, 1989

[86] PCT No.: PCT/JP89/00414
§ 371 Date: Dec. 18, 1989
§ 102(e) Date: Dec. 18, 1989

[87] PCT Pub. No.: WO89/10614
PCT Pub. Date: Nov. 2, 1989

[30] Foreign Application Priority Data
Apr. 18, 1988 [JP] Japan .................. 63-096510

[51] Int. Cl.⁵ ............................... G11B 7/00
[52] U.S. Cl. .................. 369/44.26; 369/44.28
[58] Field of Search ............. 369/44.26, 44.28, 275.3; 360/78.14

[56] References Cited

U.S. PATENT DOCUMENTS 3,919,697 11/1975 Walker .................... 369/44.26
4,977,472 12/1990 Volz et al. ................ 360/49 X

FOREIGN PATENT DOCUMENTS

51-131607 4/1976 Japan .
53-113513 4/1978 Japan .
58-175169 10/1983 Japan .
58-218079 12/1983 Japan .

Primary Examiner—Robert L. Richardson
Attorney, Agent, or Firm—Hill, Van Santen, Steadman & Simpson

[57] ABSTRACT

The method of the present invention comprises detecting a recording pattern, which is different for each tract, in each of track groups consisting of a predetermined number N or tracks recorded in advance on an optical disk(1), generating a tracking signal $S_{ET}$ whose signal level changes on the positive and negative sides of a target track $T_0$ as the center, and moving the optical spot to the target track $T_0$ on the basis of this tracking signal $S_{ET}$. In this manner, it becomes possible to prevent uncontrollable movement of the optical spot and align the optical spot to a desired recording track within a short period of time.

7 Claims, 7 Drawing Sheets

MOVEMENT OF OPTICAL HEAD

FIG.1
(PRIOR ART)

TRACKING ERROR SIGNAL

FIG.2
(PRIOR ART)

CONTROL RECORD REGION

FIG. 3

(PRIOR ART)

FIG. 4 OPTICAL DISK APPARATUS

SIGNAL WAVEFORM DIAGRAM
FIG. 5

OPTICAL DISK APPARATUS AND METHOD FOR CONTROLLING MOVEMENT OF LIGHT SPOT THEREOF

TECHNICAL FIELD

The invention relates to an optical disk apparatus and the method for controlling the movement of its light spot, and is applied to, for example, an optical disk apparatus in which data recording or reproduction is performed on an optical disk on which sequences of cyclic identification signals are recorded in advance on its consecutive recording tracks.

BACKGROUND OF ART

Heretofore, in this type of optical disk apparatus, the optical head is moved as far as the desired recording track to bring about a just-tracking state, and the desired data or information is subsequently recorded or reproduced. At this time, movement of the optical head is terminated in a shorter time to make data recording or reproduction in a shorter time as a whole.

Figure 1:
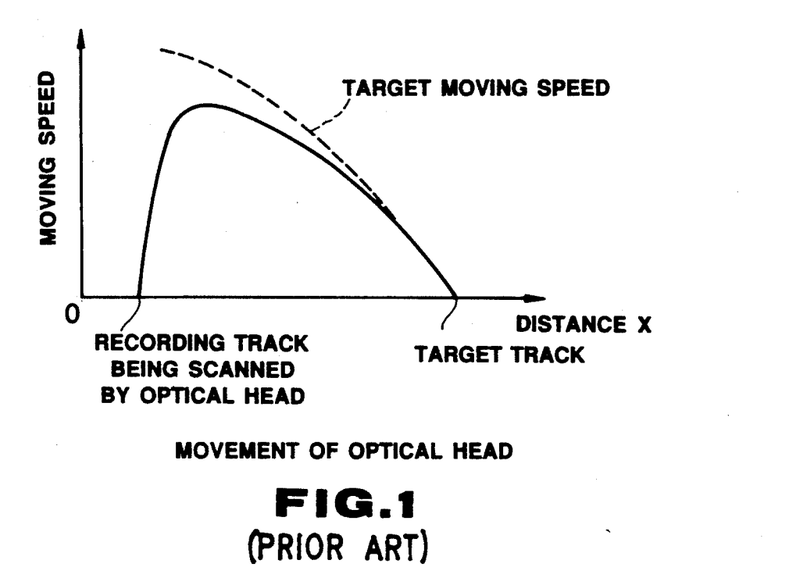
FIG. 1 shows a characteristic curve for illustration of the shifting control of an optical head in a conventional optical disk apparatus.

Thus, in the conventional optical disk apparatus, the optical head is driven so that, as shown in FIG. 1, it is accelerated promptly so that its speed of movement becomes zero on the recording track of destination, referred to hereinafter as the target track.

That is, the distance X traversed by a light spot, as shown by the following formula (1)

$$X = N \cdot T_p \qquad (1)$$

is obtained, wherein N stands for the number of recording tracks from the recording track being scanned by the light spot emanating from the optical head as far as the target track and $T_p$ the pitch of the recording tracks, and the target speed of movement proportionate to $X^{\frac{1}{2}}$ is set, for driving the optical head.

In addition, the number of tracks traversed by the light spot during movement of the optical head is counted (this counting is referred to hereinafter as traverse counting) and the traversed distance X is sequentially corrected to compensate for the target speed of movement of the optical head so that the speed of movement of the optical head becomes zero on the target track.

Figure 2:
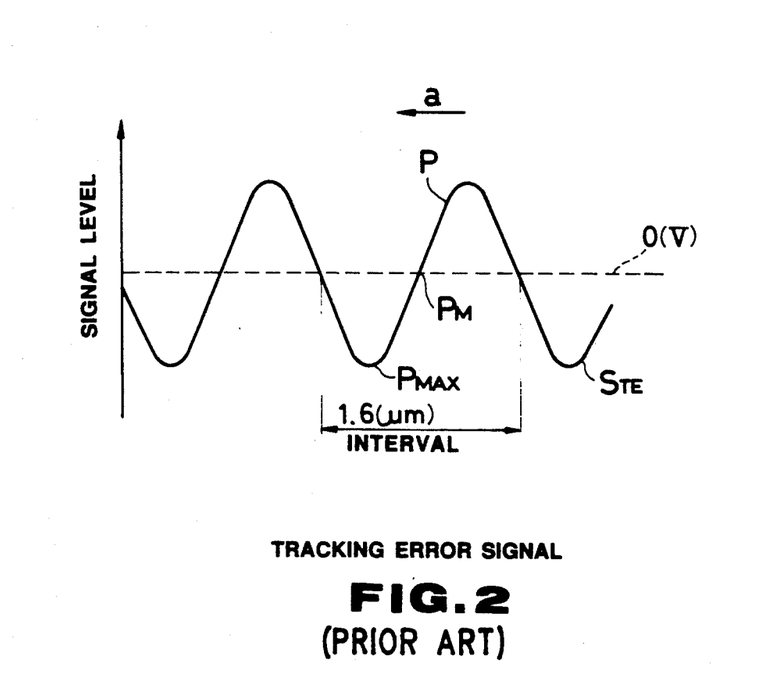
FIG. 2 is a signal waveform diagram showing tracking error signals in an optical disk apparatus.

When the light spot has moved as far as the target track, the optical head is tracking-controlled on the basis of the track error signal $S_{TE}$, as shown in FIG. 2, which is obtained by the medium of the optical head, in such a manner that the desired information may be positively recorded or reproduced with the light spot in the state of just-tracking of the target track.

Meanwhile, in this type of optical disk apparatus, if traverse counting can be made with a high degree of precision, the speed of movement of the optical head can be correctly controlled so as to be equal to zero on the target track, and hence the information can be recorded or reproduced within a correspondingly shorter time.

Figure 3:
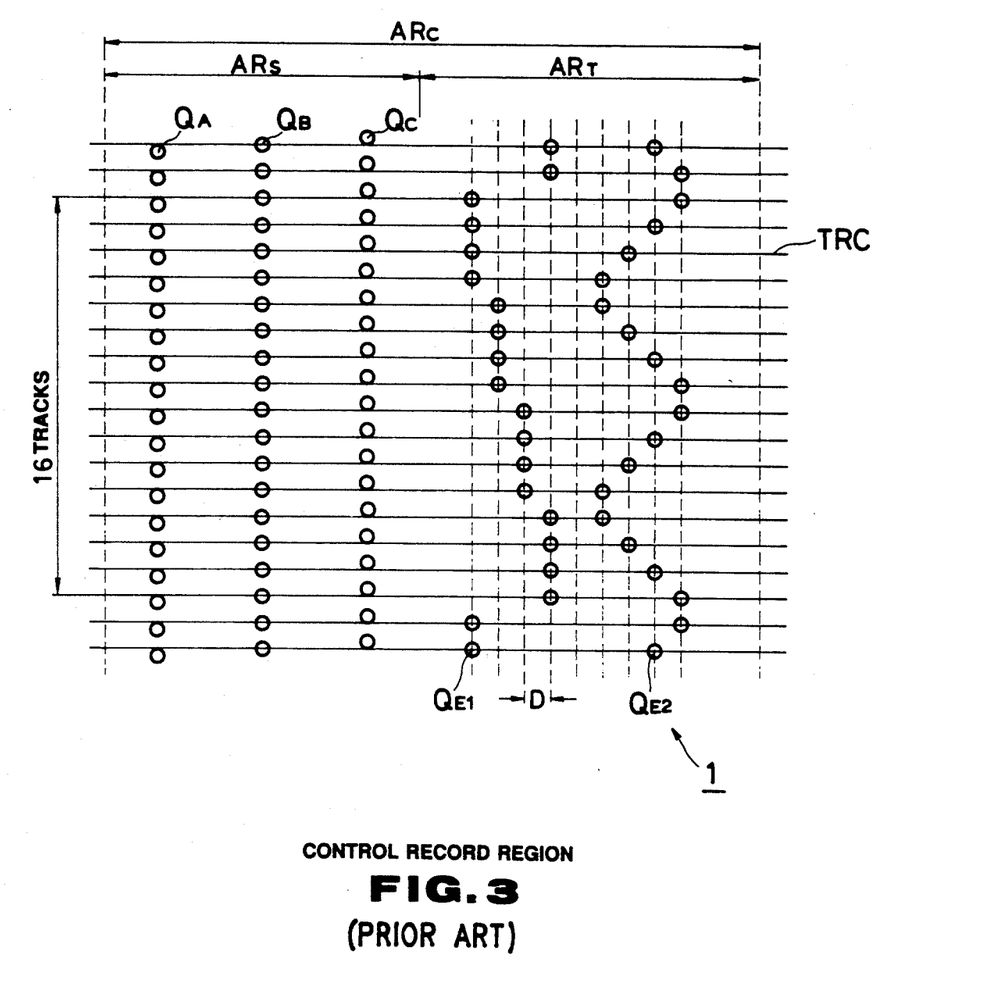
FIG. 3 is an enlarged schematic view showing a control record region of the recording pattern on an optical disk.

For this reason, there is proposed in the Japanese Patent application No. 207542/1987 or the like an arrangement in which, as shown for example in FIG. 3, sequentially circulating simple identification signals are recorded on consecutive recording tracks on the optical disk 1, so that, even when the light spot is moved across a given recording track, the position of the recording track may be discriminated.

The optical disk 1 shown in FIG. 3 is divided circumferentially into plural sectors at a predetermined angular interval, and a control recording area $AR_C$ is formed at the terminal part of each sector.

In a forward area $AR_S$ of the control recording region $AR_C$, there are formed a pit $Q_B$ on a track center TRC of each recording track, and pits $Q_A$ and $Q_C$, each with a predetermined offset from each track center TRC. Tracking error signals are obtained on the basis of these pits $Q_A$, $Q_B$ and $Q_C$.

On the other hand, in a forward zone of the control recording region $AR_C$, there is formed a traverse area $AR_T$, in which recording patterns sequentially circulated at a period of 16 tracks are formed using first pits $Q_{E1}$ and second pits $Q_{E2}$.

More specifically, the traverse area $AR_T$ is divided into eight parts at a predetermined interval D, and the first pits $Q_{E1}$ are shifted at intervals of the four consecutive record tracks towards the rear by a distance equal to the interval D. On the other hand, the second pits $Q_{E2}$ are shifted each by a distance equal to the interval D towards the rear or towards the front at periods of the four consecutive record tracks. This permits the position of the recording track being traversed by the light spot to be discriminated, even during the time that the light spot is moving across the recording track, on the basis of the generation timing of the reproducing signals of the first pits $Q_{E1}$ and the second pits $Q_{E2}$.

Hence, the target speed of movement may be obtained with high precision when the target speed of movement is corrected on the basis of the results of discrimination.

However, in practice, the recording tracks are formed on the optical disk apparatus at a higher density of the track pitch of, for example, the order of 1.6 ($\mu$m). For this reason, in the arrangement of the optical head as a whole, a fine adjustment actuator, loaded with an objective lens, is provided on a gross adjustment actuator adapted to travel radially of the optical disk, in such a manner that the movement of the optical head can be completed in a shorter time and tracking control can be made a with high degree of precision.

For this reason, when the gross adjustment actuator is driven to cause a high-speed movement of the optical head, oscillations of the objective lens loaded on the fine adjustment actuator occur unavoidably, with the result that, when the speed of movement of the optical head on the target track becomes zero, the speed of movement of the light spot formed on the optical disk 1 is not exactly equal to zero.

In this case, when the optical head is switched to tracking control at such a timing that it is moving along the direction shown by an arrow mark a in FIG. 2, with a predetermined offset from the track center $P_M$ of the target track, as shown at P in FIG. 2, the light spot movement is accelerated.

In this case, when the light spot is moved across the track center $P_M$ to a region on the negative side of the tracking error signal $S_{TE}$, the light spot movement is decelerated.

However, when the light spot is accelerated in this manner, sufficient deceleration cannot be achieved within the range up to the position of the negative maximum $P_{MAX}$ of the tracking error signal $S_{TE}$, such that the light spot is moved past the position $P_{MAX}$ as far as the next recording track.

Moreover, since the tracking error signal $S_{TE}$ repeats itself at a track pitch in the form of a sinusoidal wave, when the light spot is moved past the maximum value position $P_{MAX}$, it may occur that the light spot is moved up to the maximum point of possible movement stroke of the fine adjustment actuator, with the result that the light spot makes a run away as far as a recording track several hundreds of tracks off the track center $P_M$ of the target track.

In such case, it becomes necessary to count the number of the recording tracks from the recording track, to which the light spot has reached by run away, as far as the target track, and to return the light spot back to the desired target track, with the consequence that a correspondingly long time is expended in shifting the optical head and hence it becomes difficult to record or reproduce the information within a shorter time on the whole.

For overcoming such inconvenience, there is known a method consisting in controlling the timing of switching to tracking control in dependence upon the speed of movement of the light spot.

However, in practice, in the optical disk apparatus, offset or defects of the optical disk or the effect of disturbances extraneous to the optical disk apparatus occur unavoidably, such that the occurrence of run away of the light spot may not be prevented completely by controlling the timing of switching to tracking control of the light spot.

In view of the foregoing, it is an object of the present invention to provide an optical disk apparatus wherein the occurrence of run away of the light spot is prevented and the light spot may be moved in a short time as far as the desired recording track.

DISCLOSURE OF THE INVENTION

For accomplishing the above object, the present invention provides an optical disk apparatus comprising an optical disk on which recording patterns different for each track in each group of tracks consisting of a predetermined number N of tracks are recorded in advance, record track detection means for detecting said recording patterns for detecting the record tracks traversed by the light spot, tracking signal generating means for generating tracking signals changed in signal level on positive and negative sides of a target track as center, on the basis of the results of detection by said record track detection means, and light spot scanning means for moving the light spot as far as the target track on the basis of said tracking signals.

The present invention also provides a method for controlling the movement of a light spot in an optical disk apparatus comprising detecting record tracks traversed by the light spot by detecting the recording patterns previously formed on an optical disk, said recording tracks being different for each track in each group of tracks consisting of a predetermined number N of tracks, generating tracking signals changed in signal level on positive and negative sides about a target track as center, and moving said light spot to the target track on the basis of said tracking signals.

BEST EMBODIMENT FOR PRACTICING THE INVENTION

By referring to the drawings, an embodiment of the present invention will be hereinafter explained in detail.

Figure 4:
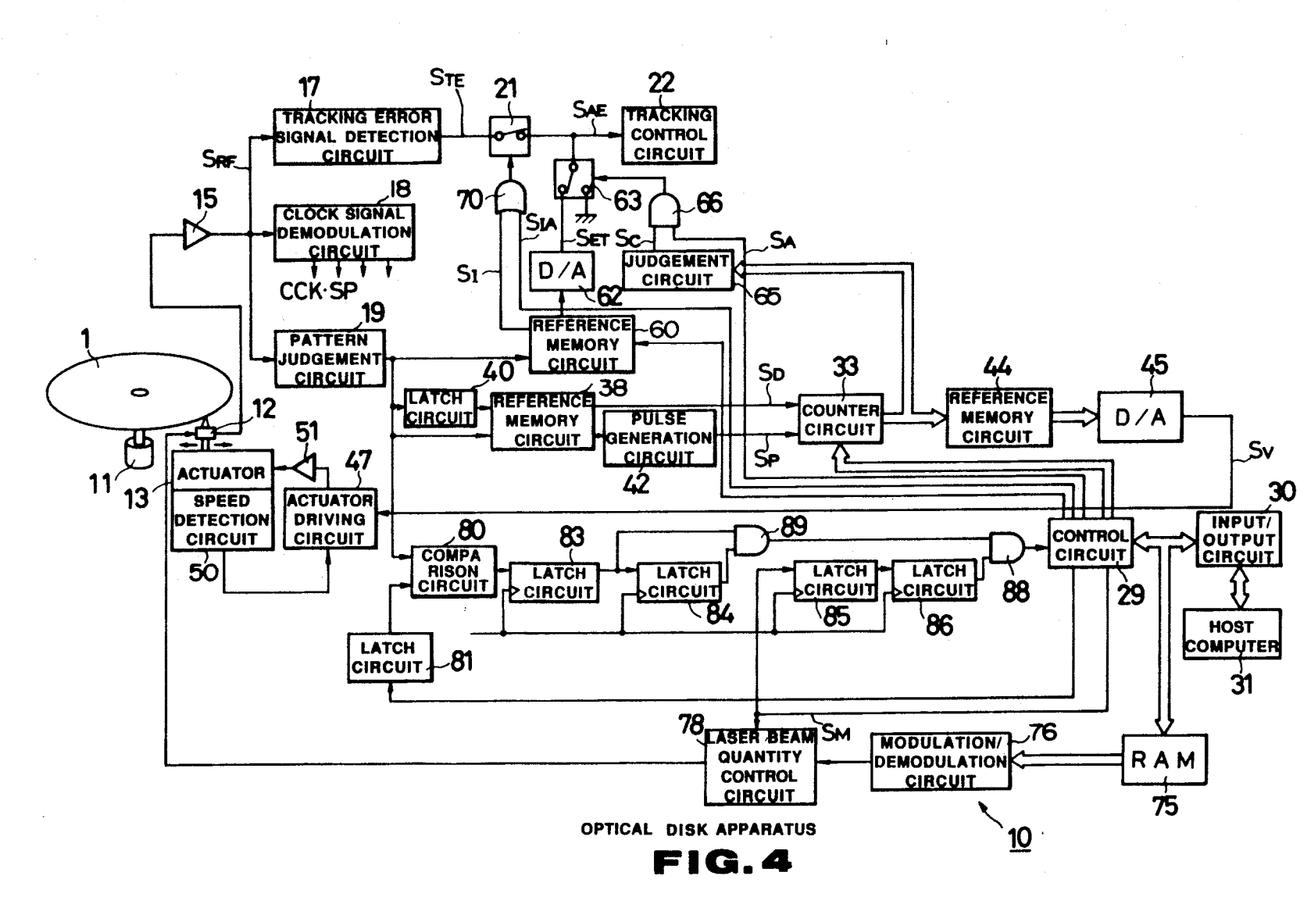
FIG. 4 is a block diagram showing an arrangement of an optical disk apparatus to which the present invention is applied.

The embodiment shown by the block diagram of FIG. 4 expresents an adaptation of the present invention to an optical disk apparatus 10 employing an optical disk 1 shown in FIG. 3 as a recording medium.

In such optical disk apparatus 10, the disk 1 is adapted to be driven rotationally by a disk motor 11 at a predetermined angular velocity.

The optical head 12 is adapted to be moved radially of the disk 1 by an actuator 13 for gross adjustment, and outputs reproducing signals $S_{RF}$ to a demodulating circuit, not shown, via a preamplifier 15, while outputting the signal to a tracking error signal detection circuit 17, a clock signal demodulating circuit 18 and to a pattern judgement circuit 19.

The clock signal demodulation circuit 18 is constituted by a phase locked loop (PLL) and functions to demodulate clock signals CCK using reproducing signals obtained from pits $Q_B$ formed in a control record area $AR_C$ of the optical disk 1, as the reference, as well as to produce sampling pulses SP for detecting the recording pattern recorded on a traverse area $AR_T$ on the optical disk 1.

The tracking error signal detection circuit 17 produces tracking error signals $S_{TE}$, on the basis of the reproducing signals obtained from the pits $Q_A$, $Q_B$ and $Q_C$ formed in the control record area $AR_C$ of the optical disk 1 and the clock signals CCK, and outputs there tracking error signals $S_{TE}$ via a switching circuit 21 to a tracking control circuit 22.

In this manner, the optical head 12 is track-controlled to a predetermined recording track on the basis of the pits $Q_A$, $Q_B$ and $Q_C$ formed in the control record area $AR_C$ on the optical disk 1.

The pattern judgement circuit 19 detects the recording pattern by the first and second pits $Q_{E1}$ and $Q_{E2}$ formed in the traverse area $AR_T$ of the optical disk 1 on the basis of the clock signals CCK and the sampling pulses SP, thereby detecting the recording pattern by the first pits $Q_{E1}$ and the second pits $QE_2$ on the traverse area $AR_T$ of the optical disk 1 for detecting the recording track being scanned by a light spot radiated from the optical head 12 for outputting the detection signal.

Thus, in conjunction with the optical head 12 and the preamplifier 15, the pattern judgement circuit 19 constitutes record track detection means for detecting the cyclically alternating record patterns formed on the consecutive record tracks on the optical disk 1 for detecting the record tracks traversed by the optical spot.

In the above described optical disk apparatus 10, the control circuit 29 receives recording or reproducing control signals from an exterior host computer 31 via an input/output circuit 30 for moving the optical head 12 to a present target track for establishing a just-tracking state. The control circuit 29 then records the information subsequently outputted from the host computer 31 or reproduces the preset recorded information from the target track.

That is, the control circuit 29 sets the number of tracks from the record track being scanned by the light spot as far as the target track on a counter circuit 33.

A reference memory circuit 38 receives a detection signal from the pattern judgement circuit 19, and a detection signal, delayed by an interval corresponding to one complete revolution of the optical disk 1, via a latch circuit 40, as input signals, and formulates the result of comparison, based on which the circuit 38 detects the moving direction of the light spot and the number of tracks traversed by the spot and outputs the results of detection to the counter circuit 33 and a pulse generation circuit 42.

Based on the results of detection outputted from the reference memory circuit 38, the pulse generation circuit 42 generates traverse detection signals Sp which rise a number of times equal to the number of tracks traversed by the light spot and outputs these signals to the counter circuit 33.

Thus there are produced in the counter circuit 33, via reference memory circuit 38, a movement direction detection signal $S_D$ representing the movement direction of the light spot and a traverse detection signal Sp representing the number of tracks traversed by the light spot.

Therefore, by sequentially changing the presetting by the control circuit 29, referred to hereinafter as the traverse count value, on the basis of the movement direction detection signal $S_D$ and the traverse detection signal Sp, the number of tracks as far as the target track can be modified sequentially with the movement of the optical head 12.

The counter circuit 33 also outputs the traverse count value to the reference memory circuit 44 to output a speed control signal $S_V$ representing the target movement speed described above in connection with the formula (1) to an actuator driving circuit 47 via a D/A converter 45.

Hence, there are supplied to the actuator driving circuit 47 the target movement speed which is sequentially modified with the movement of the optical head 12.

In this manner, the actuator driving circuit 47 outputs driving signals to the actuator for gross adjustment 13, via amplifier 51, so that the results of detection of the moving speed of the optical head 12, obtained by a speed detection circuit 50, will be equal to the target moving speed represented by the speed control signal $S_V$. The circuit 47 thus drives the optical head 12 so that its movement speed will become zero on the predetermined target track in dependence upon the target movement speed.

Meanwhile, in the present optical disk apparatus 10, as the light spot approaches to the target track, there is supplied to the tracking control circuit 22 a tracking signal SET having its signal level changed stepwise from 0 (V) about the target track as center and as a function of the distance as far as the target track.

Figure 5:
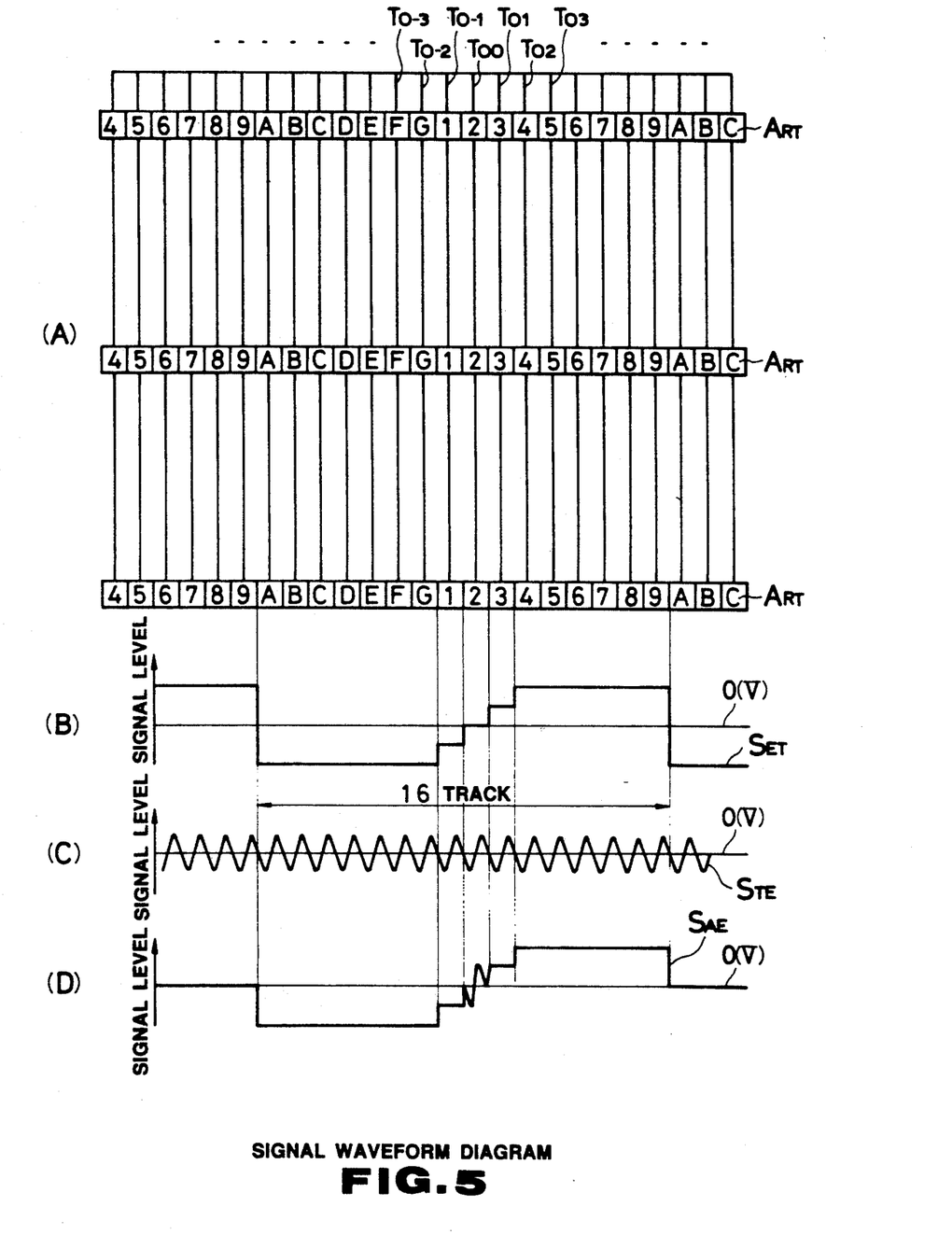
FIG. 5, consisting of (A)-(D), is a signal waveform diagram for illustrating the operation of the above mentioned optical disk apparatus.

That is, the record pattern is represented by symbols "1" to "g", as shown at A in FIG. 5, and the reference memory circuit 60 receives the detection signal of the recording patterns from the pattern judgement circuit 19 and the target track signal representing the recording pattern of the target track from the control circuit 29, as inputs, while circuit 60 also outputs a tracking signal $S_{ET}$, as shown at B in FIG. 5, to a selection circuit 63 via D/A converter 62. This tracking signal $S_{ET}$ is 0 (V) when the recording pattern of the recording track being scanned by the light spot coincides with the recording pattern of the target track $T_0$, rises towards the positive side or falls to the negative side when the recording pattern of the recording track being scanned by the light spot coincides with the two tracks before the target track $T_{0-2}$, $T_{0-1}$ or with the two tracks after the target track $T_{01}$, $T_{02}$, respectively, and is reversed in signal level, with the recording pattern off eight tracks from the target track as the boundary.

A signal level of the tracking signal $S_{ET}$ is more than a signal level of the tracking error signal $S_{TE}$ within a dynamic range of the tracking control circuit 22. The tracking error signal is shown at C in FIG. 5.

The judgement circuit 65 receives a traverse count value from the counter circuit 33 and outputs a tracking changeover signal $S_C$ which rises in level when the traverse count value is decreased to not more than eight tracks.

An AND circuit 66 receives the tracking changeover signal $S_C$ and an access signal $S_A$ which rises in level during the time the optical head 12 is being moved towards the target track $T_0$, from the control circuit 29, and outputs a signal switching the contact of the selection circuit 63.

In this manner, as long as the optical head 12 is being moved towards the target track $T_0$, the input side of the tracking control circuit 22 is grounded to reduce oscillations of the micromotion adjustment actuator accompanying the movement of the optical head 12 and, as the optical head 12 approaches to the target track $T_0$ to within the distance of not more than eight tracks, the tracking signal SET is supplied to the tracking control circuit 22.

In this manner, during the time the optical head 12 is being moved towards the target track $T_0$, the distance as far as the target track $T_0$ is sensed, and the tracking signal $S_{ET}$ is formed which is changed in level with the distance more pronouncedly than the tracking error signal $S_{TE}$ about the 0 (V) as center, for drive-controlling the optical head 12, in such a manner that the light spot may be captured more powerfully and extensively on the target track $T_0$ than in the case wherein the light spot is captured using the tracking error signal $S_{TE}$.

Thus the run away of the light spot may be prevented from occurring and the light spot may be captured reliably and expeditiously on the target track $T_0$.

That is, the optical head 12 is drive-controlled so that the movement speed becomes zero on the predetermined target track $T_0$, while being drive-controlled so that, when the spot is moved to the vicinity of the target track $T_0$, the spot may be captured outs the target track $T_0$.

In this manner, the control circuit 29, counter circuit 33, reference memory circuits 38, 60, latch circuit 40, pulse generation circuit 42, D/A converter 62, section circuit 63, judgement circuit 65 and the AND circuit 66 in their entirety make up tracking signal generating means for generating the tracking signal $S_{ET}$ which is changed in signal level towards positive and negative sides, about the target track $T_0$ as center, on the basis as a whole of the results of detection of the recording tracks traversed by the light spot, whereas the optical head 12 and the tracking signal control circuit 22 make up light spot scanning means for moving the light spot as far as the target track $T_0$ based on the tracking signal $S_{ET}$.

Also, in this optical disk apparatus 10, when the optical head 12 is moved as far as the target track $T_0$, the tracking control circuit 22 outputs a tracking error signal $S_{TE}$ to perform tracking control of the light spot towards the target track $T_0$.

That is, when the record pattern of the record track scanned by the light spot coincides with the record pattern of the target track $T_0$, the reference memory circuit 60 outputs a detection signal $S_I$ going high in signal level to an OR circuit 70.

The OR circuit 70 receives the detection signal $S_I$ and a signal $S_{IA}$ inverted from the access signal $S_A$ from the control circuit 29 and issues a resulting output signal switching the contact of the switching circuit 21.

In this manner, a signal $S_{AE}$ synthesized from the tracking signal $S_{ET}$ and the tracking error signal $S_{TE}$, which signal $S_{AE}$ rises and falls in signal level towards the positive and negative sides about the track center of the target track $T_0$ as center, as shown at D in FIG. 5, is entered to the tracking control circuit 22.

In addition, in the optical disk apparatus 10, when the light spot is controlled on the target track $T_0$ under the just-track state, input data outputted next from the host computer 31 are supplied via random access memory circuit 75 to a modulation/demodulation circuit 76, and the light spot is controlled on the basis of the above mentioned input data and a mode switching signal SM outputted from the control circuit 29 for recording the input data on the optical disk 1.

Similarly, in this optical disk apparatus 10, when control signals for a reproducing operation is entered thereto from the host computer 31, predetermined record data are reproduced and outputted from the target track $T_0$ on the optical disk 1.

Furthermore, in the optical disk apparatus 10 of the illustrative embodiment, when the light spot continues to be off the target track $T_0$ of the optical disk 1 for a predetermined time, the operational modes for the recording and reproducing operations are cancelled to prevent the occurrence of malfunctions of the optical disk apparatus 10.

That is, in the optical disk apparatus 10, a comparison circuit 80 is supplied as input signals with a recording pattern of a target track via a latch circuit 81 and with a recording pattern of that recording track which is being scanned by the light spot, and the results of comparison between the two patterns are transmitted to a series connection of latch circuits 83 and 84 adapted to be driven at a period correspnding to one complete revolution of the optical disk 1.

A series connection of latch circuits 85 and 86, adapted to be driven at a period corresponding to one complete revolution of the optical disk 1, similarly to the latch circuits 83 and 84, is supplied with the mode switching signal SM, and outputs a mode switching signal to an AND circuit 88, which mode switching signal is delayed by a time period equal to the results of comparison outputted from the latch circuit 84.

The AND circuit 88 is supplied via AND circuit 89 with a logical product of output signals from the latch circuits 83 and 84 and with an output signal of the latch circuit 86 and, based on the logical product thereof, issues an output signal for stopping the recording and reproducing operations to the control circuit 29.

In the above construction of the optical disk apparatus 10, when recording or reproducing control signals are supplied thereto from the host computer 31, the number of recording tracks from the recording track scanned by the light spot as far as the target track is set in the counter 33 as the traverse count value, and a target moving speed is set on the basis of the traverse count value to perform driving control of the optical head 12.

The traverse count value is updated in accordance with the movement direction detection signal $S_D$ and the traverse detection signal $S_P$ produced in the pattern discriminating circuit 19, latch circuit 40, reference memory circuit 38 and in the pulse generator 42.

In this manner, the recording tracks traversed by the light spot are detected on the basis of the recording pattern formed in the traverse region ART on the optical disk 1 and the traverse count value is compensated with continued movement of the light spot.

Thus the optical head 12 is drive-controlled so that its speed of movement becomes zero on the target track.

In addition, when the light spot approaches to within eight tracks from the target track $T_0$, there is formed, on the basis of the record pattern formed in the traverse region $AR_T$, a tracking signal $S_{ET}$ which has a larger signal level than that of the tracking error signal $S_{TE}$ and which is changed in signal level within the distance of two tracks on both sides of the target track $T_0$ as center, is formed and supplied to the tracking control circuit 22 via reference memory circuit 60 and D/A converter 62, thereby to capture the light spot on the target track $T_0$.

In addition, when the light spot is captured on the target track $T_0$, the tracking error signal $S_{TE}$ is supplied to the tracking control circuit 22 in place of the tracking signal $S_{ET}$, whereby the light spot is tracking controlled so as to be situated on the target track $T_0$.

In accordance with the above described construction, the cyclically alternating recording patterns formed on the continuous recording tracks on the optical disk are detected, and the tracking signal $S_{ET}$ is formed, which has a larger signal level than that of the tracking error signal $S_{TE}$ and which is changed in signal level within the extent of two tracks on both sides of the target track $T_0$ as center. The light spot is captured on the target track $T_0$ on the basis of this tracking signal $S_{ET}$ in such a manner that the light spot can be captured on the target track $T_0$ more reliably than in the case wherein the light spot is captured on the target track $T_0$ with the use only of the tracking error signal $S_{TE}$.

In this manner, the run away of the light spot may be prevented from occurring and the optical head can be moved to the desired recording track in a shorter time.

Figure 6:
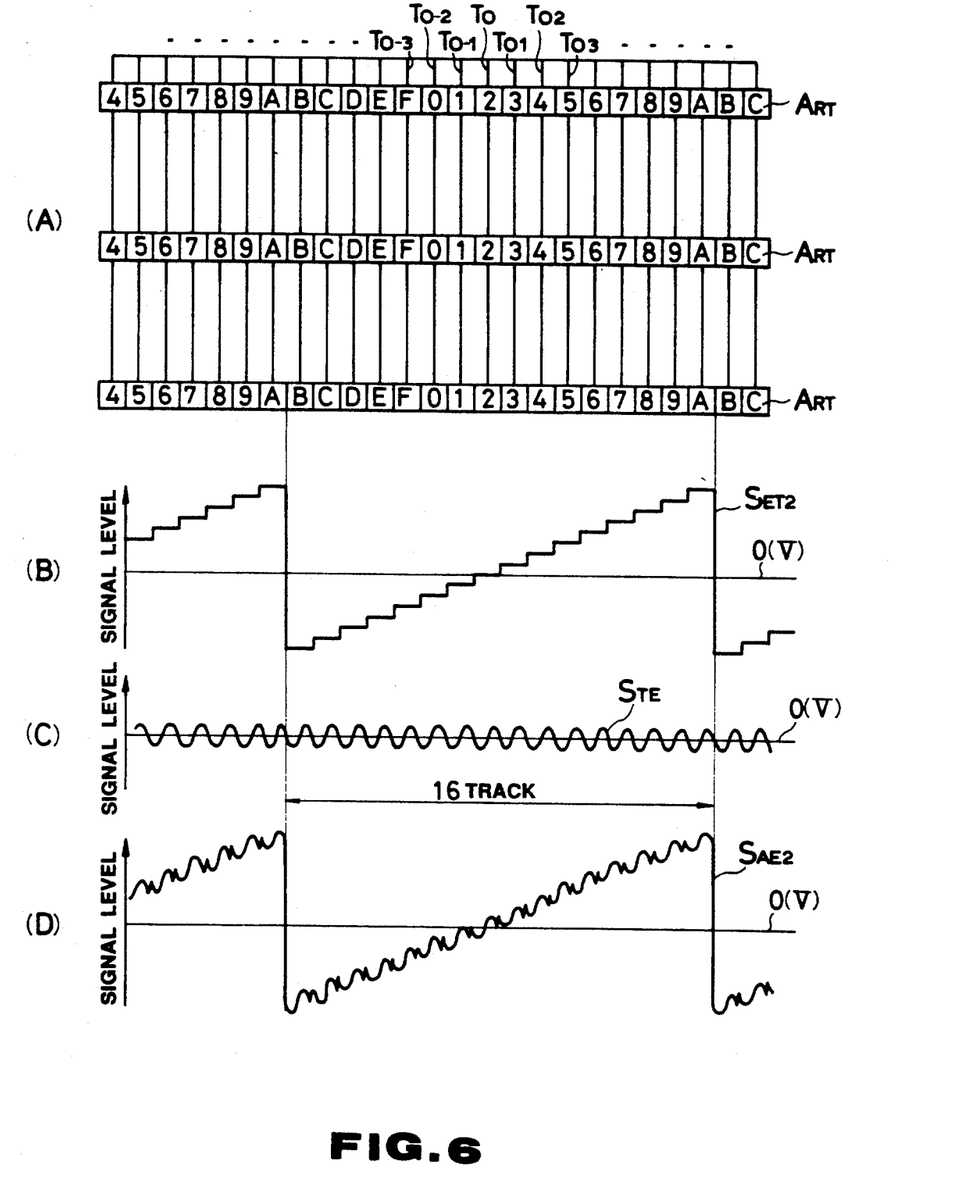
FIG. 6, consisting of (A)-(D), is a signal waveform diagram for illustrating the operation of a modified embodiment of the present invention.

In the above described illustrative embodiment, the tracking control signal $S_{ET}$ is generated which is changed in signal level within the extent of two tracks on both sides of the target track $T_0$. Alternatively, a tracking signal $S_{ET2}$ may be formed, as shown at B in FIG. 6, which is changed stepwise in signal level within the range of allowance of the dynamic range of the tracking control circuit 22 and within the extent of eight tracks on both sides of the target track $T_0$ in correspondence with the cyclically alternating recording pattern on the optical disk as shown at A in FIG. 6, in place of the aforementioned tracking signal SET, and the tracking signal $S_{ET2}$ may be then combined with the tracking error signal $S_{TE}$ shown at C in FIG. 6 to produce a combined signal $S_{AE2}$ as shown at D in FIG. 6, by means of which the light spot is to be captured on the target track $T_0$.

With the use of the tracking signal $S_{ET2}$ that may be changed over a wider range in signal level, the light spot can be captured reliably on the target track $T_0$ as compared with the case in which the light spot is captured on the target track $T_0$ by relying solely upon the tracking error signal $S_{TE}$, with the result that run away of the light spot may be prevented from occurring and the optical head may be moved in a shorter time as far as the desired recording track.

Figure 7:
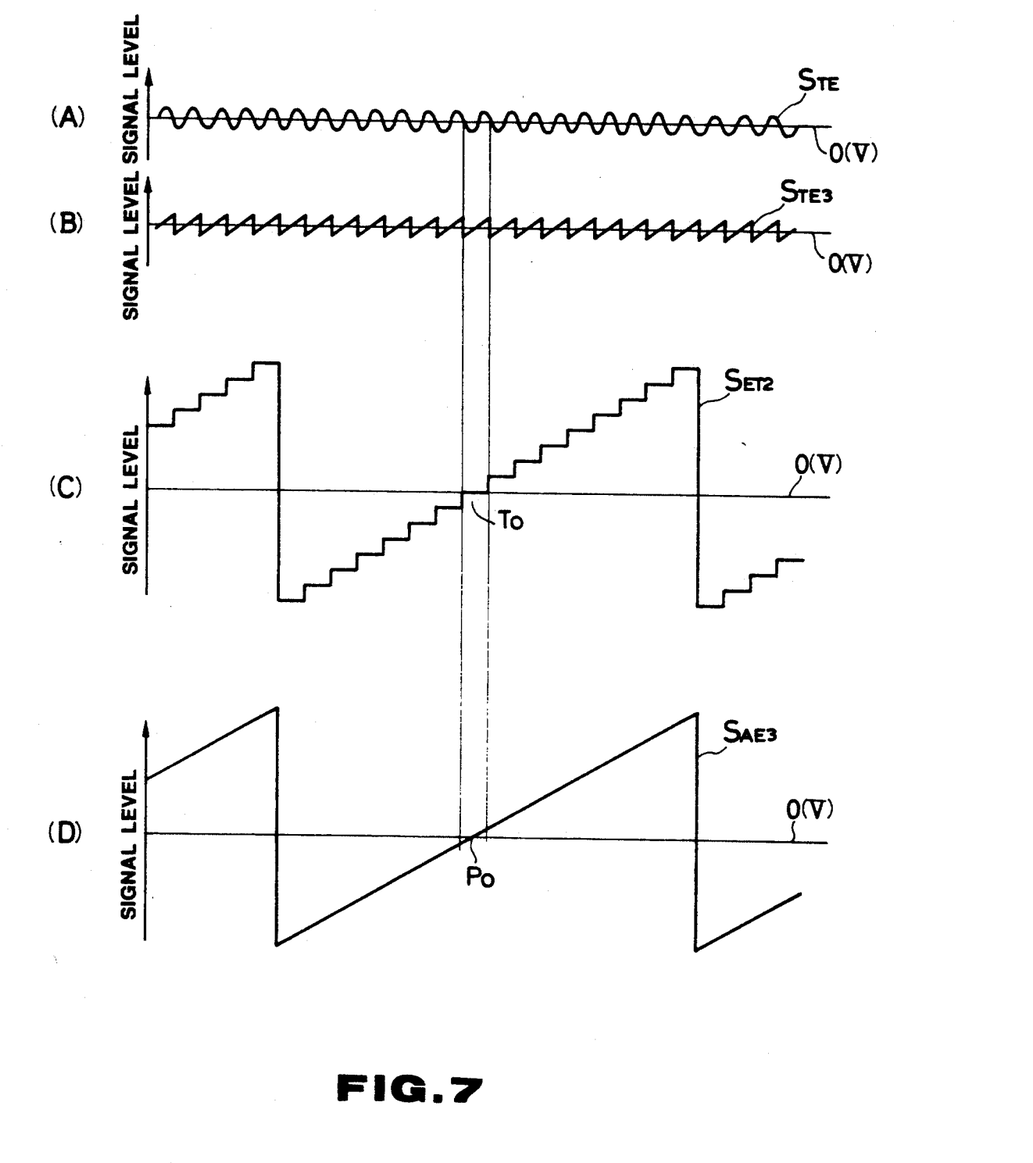
FIG. 7, consisting of (A)-(D), is a signal waveform diagram for illustrating the operation of another modified embodiment of the present invention.

In the above described illustrative embodiment, the sinusoidally changing tracking error signal STE as shown at A in FIG. 7 is used. Alternatively, a tracking error signal $S_{TE3}$ having a signal level which becomes 0 (V) at the track center and which is changed in a serrated manner at one track period, as shown at B in FIG. 7, may be produced, in place of the tracking error signal $S_{TE}$, and may be then combined with a tracking signal $S_{ET2}$ having a signal level changed stepwise as shown at C in FIG. 7 to produce a combined signal $S_{AE3}$, as shown at D in FIG. 7, so that the light spot will be captured on the target track $T_0$ on the basis of this combined signal $S_{AE3}$.

In this case, using the technique proposed in the above mentioned Japanese Patent Application No. 12716/1987, the amount of light reflected from the pits $Q_A$, $Q_B$ and $Q_C$ on the optical disk 1 shown in FIG. 3 is detected and, based on the results of detection, the above mentioned tracking error signal $S_{TE3}$ is synthesized from the data stored in the memory circuit.

Figure 8:
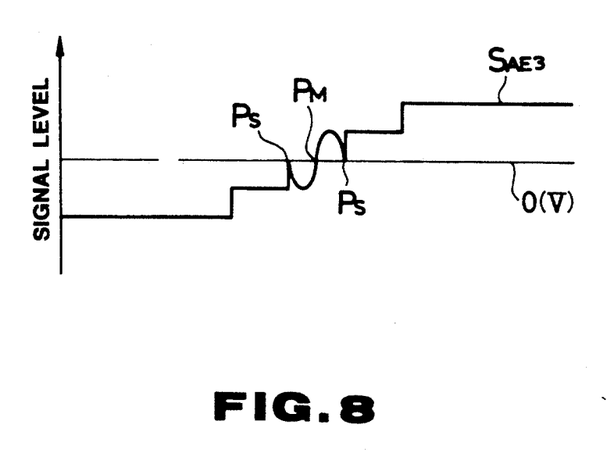
FIGS. 8 and 9 are signal waveform diagrams for illustrating the operation of further modified embodiments of the present invention.
Figure 9:
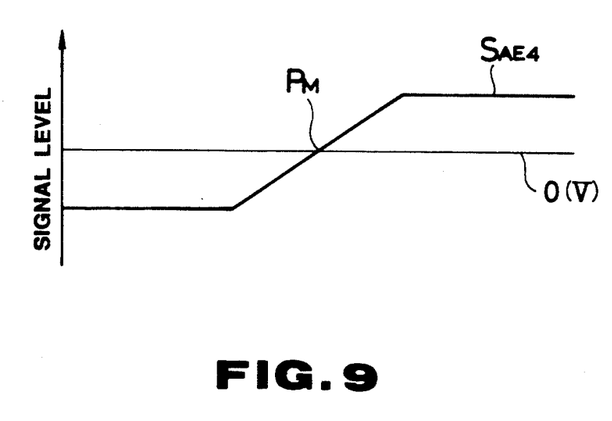

In practice, when the above mentioned combined signal $S_{AE}$ shown at D in FIG. 5 or the combined signal $S_{AE2}$ shown at D in FIG. 5 is synthesized, with the aid of the sinusoidally changing tracking error signal $S_{TE}$, the signal level of the combined signal $S_{AE}$ or $S_{AE2}$ becomes 0 (V) at a position $P_S$ ahead or back of the track center $P_M$, as shown in FIG. 8. Hence, there is the risk for the light spot to be set at the positions $P_S$ ahead or back of the track center $P_M$, without being set on the track center $P_M$.

However, when the combined signal $S_{AE3}$ is synthesized with the aid of a tracking error signal $S_{TE3}$ which is changed in a serrated manner as described above, the combined signal $S_{AE3}$ may be obtained having a signal level which rises or falls on the positive or negative sides with a predetermined gradient over a wide range in which the signal level is changed stepwise, as shown at C in FIG. 7, with 0 (V) as center, so that the light spot may be captured positively on the track center $P_M$.

In the above described illustrative embodiment, the tracking error signal $S_{TE3}$ changed in a serrated manner is combined with the tracking signal $S_{ET2}$ having the signal level changed stepwise within the extent of eight tracks ahead and back of the target track $T_0$ as center, to produce the combined signal $S_{AE3}$, whereby the light spot is captured on the target track $T_0$. However, the present invention is not limited to such embodiment. For example, the tracking signal $S_{ET}$ which is changed in signal level within the extent of two tracks ahead and back of the target track $T_0$ as center may be combined with the tracking error signal $S_{TE3}$ changed in a serrated manner to produce a combined signal $S_{AE4}$, which is then used to capture the light spot on the target track $T_0$.

In such case, the light spot may be captured effectively on the target track $T_0$, even when the tracking control circuit 22 has only a limited dynamic range.

Furthermore, in the above described illustrative embodiment, the tracking signal $S_{ET}$ changed in signal level within the range of two tracks about the target track $T_0$ as center and the tracking signal $S_{ET2}$ changed stepwise in signal level within the extent of eight tracks about the target track $T_0$ as center are formed to capture the light spot on the target track $T_0$. However, the present invention is not limited thereto, but a tracking signal which is changed in signal level within the extent of several tracks about the target track $T_0$ as center or within the range exceeding the period of repetition of the cyclically alternating recording patterns on the optical disk may be formed to capture the light spot on the target track $T_0$.

In this case, the steps of changes of the signal level of the tracking signal may be enlarged as the light spot approaches to the target track $T_0$ or, alternatively, the signal level may be changed at a pitch of one track in the vicinity of the target track $T_0$ and at the pitch of several tracks as the light spot is moved away from the target track $T_0$.

In the above illustrative embodiment, the combined signal $S_{AE3}$ of the tracking error signal and the tracking signal is entered to the tracking control signal. This invention is not limited to this embodiment, but the combined signal $S_{AE3}$ may be entered to the actuator driving circuit 47 for driving the actuator 13 for gross adjustment.

In addition, in the above illustrative embodiment, the present invention is applied to an optical disk apparatus for data recording and reproduction. However, the present invention is not limited thereto, but may be broadly applied to an optical disk apparatus dedicated to reproduction, such as a compact disk player.

What is claimed is:

1. An optical disk apparatus comprising an optical disk having a plurality of track groups, each with N tracks, on which recording patterns are recorded in advance, which patterns are different for each track in each said group of tracks, light spot scanning means, record track detection means for detecting said recording patterns for detecting the record tracks traversed by said light spot, tracking signal generating means connected to said record track detection means and responsive thereto for generating tracking signals which change in signal polarity on opposite sides of a target track, and which increase in level as said target track is approached, and light spot scanning means for moving the light spot as far as the target track on the basis of said tracking signals.

2. The optical disk apparatus according to claim 1, including discriminating means for determining that the difference in the number of tracks between the record track scanned by said light spot scanning means and the target track has become equal to or less than one half the prescribed number of tracks N constituting the group of tracks, to determine that said target track is being approached, and means for connecting said light spot scanning means to said discriminating means.

3. The optical disk apparatus according to claim 1 characterized in that said record track detection means causes a tracking error signal to be supplied to said light spot scanning means when the light spot reaches the target track.

4. The optical disk apparatus according to claim 1, including an actuator for coarse position adjustment and wherein said light spot scanning means comprises fine adjustment actuating means.

5. The optical disk apparatus according to claim 4, including means for driving said actuator in accordance with a function of the difference in the number of tracks between the record track scanned by the light spot and the target track.

6. A method for controlling the movement of a light spot in an optical disk apparatus in which an optical disk has plural groups of tracks, each with N record tracks having recording patterns thereon, comprising the steps of detecting record tracks traversed by the light spot by detecting the recording patterns previously formed on an optical disk, said recording patterns being different for each track in each said group of tracks, generating tracking signals changed in signal polarity on opposite sides of a target track, and increased in level as said target track is approached, and moving said light spot to the target track on the basis of said tracking signals.

7. The method for controlling the movement of a light spot in an optical disk apparatus according to claim 6, including the steps of discriminating that the difference in the number of tracks between the record track scanned by the light spot and the target track has become equal to one half of the predetermined number N, to determine that said target track is being approached, and switching the amount of controlled movement of the light spot based on the tracking signals in dependence upon the results of said discrimination.

* * * * *